US012033259B2

(12) United States Patent
Kwatra et al.

(10) Patent No.: US 12,033,259 B2
(45) Date of Patent: Jul. 9, 2024

(54) PHOTOREALISTIC TALKING FACES FROM AUDIO

(71) Applicant: Google LLC, Mountain View, CA (US)

(72) Inventors: Vivek Kwatra, Saratoga, CA (US); Christian Frueh, Mountain View, CA (US); Avisek Lahiri, West Bengal (IN); John Lewis, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 159 days.

(21) Appl. No.: 17/796,399

(22) PCT Filed: Jan. 29, 2021

(86) PCT No.: PCT/US2021/015698
§ 371 (c)(1),
(2) Date: Jul. 29, 2022

(87) PCT Pub. No.: WO2021/155140
PCT Pub. Date: Aug. 5, 2021

(65) Prior Publication Data
US 2023/0343010 A1    Oct. 26, 2023

Related U.S. Application Data

(60) Provisional application No. 62/967,335, filed on Jan. 29, 2020.

(51) Int. Cl.
*G06T 13/20*    (2011.01)
*G06T 13/40*    (2011.01)
*G06T 17/20*    (2006.01)

(52) U.S. Cl.
CPC ............ *G06T 13/205* (2013.01); *G06T 13/40* (2013.01); *G06T 17/20* (2013.01)

(58) Field of Classification Search
None
See application file for complete search history.

(56) References Cited

U.S. PATENT DOCUMENTS

2012/0280974 A1    11/2012  Wang et al.
2017/0243387 A1     8/2017  Li et al.
(Continued)

OTHER PUBLICATIONS

Oh, Tae-Hyun, et al. "Speech2face: Learning the face behind a voice." Proceedings of the IEEE/CVF conference on computer vision and pattern recognition. 2019. (Year: 2019).*
(Continued)

*Primary Examiner* — Ryan M Gray
(74) *Attorney, Agent, or Firm* — DORITY & MANNING P.A.

(57) ABSTRACT

Provided is a framework for generating photorealistic 3D talking faces conditioned only on audio input. In addition, the present disclosure provides associated methods to insert generated faces into existing videos or virtual environments. We decompose faces from video into a normalized space that decouples 3D geometry, head pose, and texture. This allows separating the prediction problem into regressions over the 3D face shape and the corresponding 2D texture atlas. To stabilize temporal dynamics, we propose an autoregressive approach that conditions the model on its previous visual state. We also capture face illumination in our model using audio-independent 3D texture normalization.

20 Claims, 12 Drawing Sheets

(56) References Cited

U.S. PATENT DOCUMENTS

| | | |
|---|---|---|
| 2019/0197755 A1 | 6/2019 | Vats |
| 2022/0036636 A1* | 2/2022 | Lin .................... G06T 19/00 |

OTHER PUBLICATIONS

Wiles, Olivia, A. Koepke, and Andrew Zisserman. "X2face: A network for controlling face generation using images, audio, and pose codes." Proceedings of the European conference on computer vision (ECCV). 2018. (Year: 2018).*

Suwajanakorn, Supasorn, Steven M. Seitz, and Ira Kemelmacher-Shlizerman. "Synthesizing obama: learning lip sync from audio." ACM Transactions on Graphics (ToG) 36.4 (2017): 1-13. (Year: 2017).*

Karras, Tero, et al. "Audio-driven facial animation by joint end-to-end learning of pose and emotion." ACM Transactions on Graphics (TOG) 36.4 (2017): 1-12. (Year: 2017).*

Abadi et al., "TensorFlow: Large-Scale Machine Learning on Heterogenous Distributed Systems", arXiv:1603.04467v2, dated Mar. 16, 2016, 19 pages.

Abdelaziz et al., "Modality Dropout for Improved Performance-driven Talking Faces", arXiv:2005.13616v1, dated May 27, 2020, 13 pages.

Assael et al., "LipNet: End-to-End Sentence-Level Lipreading", arXiv:1611.01599v2, dated Dec. 16, 2016, 13 pages.

Beeler et al., "Rigid stabilization of facial expressions", ACM Transactions on Graphics, vol. 33, No. 4, 2014, pp. 1-9.

Bitouk et al., "Creating a Speech Enabled Avatar from a Single Photograph", 2008 IEEE Virtual Reality Conference, 2008, pp. 107-110.

Booth et al., "Optimal UV Spaces for Facial Morphable Model Construction", 2014 IEEE international conference on image processing (ICIP), 2014, pp. 4672-4676.

Bregler et al., "Video Rewrite: Driving Visual Speech with Audio", Proceedings of the 24th annual conference on Computer graphics and interactive techniques, 1997, pp. 353-360.

Chen et al., "Hierarchical Cross-Modal Talking Face Generation with Dynamic Pixel-Wise Loss", Proceedings of the IEEE/CVF conference on computer vision and pattern recognition, 2019, pp. 7832-7841.

Chen et al., "Lip Movements Generation at a Glance", Proceedings of the European Conference on Computer Vision (ECCV), 2018, pp. 538-553.

Chung et al., "Out of time: automated lip sync in the wild", Asian conference on computer vision, 2016 pp. 251-263.

Chung et al., "You said that?", arXiv:1705.02966v2, dated Jul. 18, 2017, 12 pages.

Cooke et al., "An audio-visual corpus for speech perception and automatic speech recognition (L)", Journal of the Acoustical Society of America, vol. 120, No. 5, 2006, pp. 2421-2424.

Cudeiro et al., "Capture, Learning, and Synthesis of 3D Speaking Styles", arXiv:1905.03079v1, dated May 8, 2019, 11 pages.

Edwards et al., "JALI: An Animator-Centric Viseme Model for Expressive Lip Synchronization", ACM Transactions on graphics (TOG), vol. 35, No. 4, 2016, 11 pages.

Fried et al., "Text-based Editing of Talking-head Video", ACM Transactions on Graphics (TOG), vol. 38, No. 4, 2019, 14 pages.

Hannun et al., "Deep Speech: Scaling up end-to-end speech recognition", arXiv:1412.5567v2, dated Dec. 19, 2014, 12 pages.

Harte et al., "TCD-TIMIT: An audio-visual corpus of continuous speech", IEEE Transactions on Multimedia, vol. 17, No. 5, 2015, pp. 603-615.

Hsu et al., "Hierarchical Generative Modeling for Controllable Speech Synthesis", ICLR 2019 Conference Blind Submission, 2019, 27 pages.

International Preliminary Report on Patentability for Application No. PCT/US2021/015698, mailed Aug. 11, 2022, 9 pages.

International Search Report and Written Opinion for Application No. PCT/US2021/015698, mailed May 25, 2021, 15 pages.

Karras et al., "Audio-Driven Facial Animation by Joint End-to-End Learning of Pose and Emotion:", ACM Transactions on Graphics (TOG), vol. 36, No. 4, 2017, 12 pages.

Kartynnik et al., "Real-time Facial Surface Geometry from Monocular Video on Mobile GPUs", arXiv:1907.06724v1, dated Jul. 15, 2019, 4 pages.

Keutmann et al., "Generating an item pool for translational social cognition research: Methodology and initial validation", Behavior research methods, vol. 47, No. 1, 2015, pp. 228-234.

Kim et al., "Deep Video Portraits", arXiv:1805.11714v1, dated May 29, 2018, 14 pages.

Kumar et al., "ObamaNet: Photo-Realistic lip-sync from text", arXiv:1801.01442v1, dated Dec. 6, 2017, 4 pages.

Lahiri et al., "LipSync3D: Data-Efficient Learning of Personalized 3D Talking Faces from Video using Pose and Lighting Normalization", arXiv:2106.04185v1, dated Jun. 8, 2021, 16 pages.

Lamarre et al., "Face Stabilization by Mode Pursuit for Avatar Construction in the Universe", 2018 International Conference on Image and Vision Computing New Zealand (IVCNZ), 2018, pp. 1-6.

Lewis et al., "Practice and Theory of Blendshape Facial Models", Eurographics (State of the Art Reports), vol. 1, No. 8, 2014, 20 pages.

Li et al., "Learning a model of facial shape and expression from 4D scans", ACM Transactions on Graphics, vol. 36, No. 6, 2017, 17 pages.

Mathieu et al., "Deep Multi-Scale Video Prediction Beyond Mean Square Error", arXiv:1511.05440v6, dated Feb. 26, 2016, 14 pages.

Mittal et al., "Animating Face using Disentangled Audio Representations", Proceedings of the IEEE/CVF Winter Conference on Applications of Computer Vision, 2020, pp. 3290-3298.

Mukhopadhyay et al., "Towards Automatic Face-to-Face Translation", arXiv:2003.00418v1, dated Mar. 1, 2020, 9 pages.

Narvekar et al., "A n0-reference perceptual image sharpness metric based on a cumulative probability of blur detection", 2009 International Workshop on Quality of Multimedia Experience, 2009, pp. 87-91.

Prajwal et al., A Lip Sync Expert is All You Need for Speech to Lip Generation in the World, arXiv:2008.10010v1, dated Aug. 23, 2020, 10 pages.

Song et al., "Everybody's Talkin': Let Me Talk as You Want", arXiv:2001.05201v1, dated Jan. 15, 2020, 13 pages.

Suwajanakorn et al., "Synthesizing Obama: learning lip sync from audio", ACM Transactions on Graphics, vol. 36, No. 4, 2017, 13 pages.

Thies et al., "Face2Face: Real-time Face Capture and Reenactment of RGB Videos", IEEE Conference on Computer Vision and Pattern Recognition (CVPR), 2016, pp. 2387-2395.

Thies et al., "Neural Voice Puppetry: Audio-driven Facial Reenactment", arXiv:1912.05566v2, dated Jul. 29, 2020, 23 pages.

Umeyama, "Least-Squares Estimation of Transformation Parameters Between Two Point Patterns", IEEE Transactions on Pattern Analysis and Machine Intelligence, 1991, vol. 13, pp. 376-380.

Vougioukas et al., "End-to-End Speech-Driven Realistic Facial Animation with Temporal GANs", CVPR Workshops, 2019, pp. 37-40.

Vougioukas et al., "Realistic Speech-Driven Facial Animation with GANs", arXiv:1906.06337v1, dated Jun. 14, 2019, 16 pages.

Wang et al., "High Quality Lip-Sync Animation for 3D Photo-Realistic Talking Head", 2012 IEEE International Conference on Acoustics, Speech and Signal Processing (ICASSP), 2012, pp. 4529-4532.

Wang et al., "Text Driven 3D Photo-Realistic Talking Head", Twelfth Annual Conference of the International Speech Communication Association, 2011, 2 pages.

Wikipedia, "Short-time Fourier transform", 2019, https://en.wikipedia.org/wiki/Short-time_Fourier_transform, retrieved on Aug. 16, 2022, 10 pages.

Wiles et al., "X2Face: A network for controlling face generation using images, audio, and pose codes", Proceedings of the European conference on computer vision (ECCV), 2018, pp. 670-686.

Williams et al., "A learning algorithm for continually running fully recurrent neural networks", Neural computation, vol. 1, No. 2, 1989, pp. 270-280.

(56) References Cited

OTHER PUBLICATIONS

Yang et al., "Efficient and robust specular highlight removal", IEEE transactions on pattern analysis and machine intelligence, vol. 37, No. 6, 2014, pp. 1304-1311.

Zhou et al., "Talking Face Generation by Adversarially Disentangled Audio-Visual Representation", Proceedings of the AAAI conference on artificial intelligence, vol. 33, No. 01, 2019, pp. 9299-9306.

Zhou et al., "VisemeNet: Audio-Driven Animator-Centric Speech Animation", ACM Transactions on Graphics (TOG), vol. 37, No. 4, 2018, 10 pages.

* cited by examiner

PHOTOREALISTIC TALKING FACES FROM AUDIO

PRIORITY CLAIM

This application is based upon and claims the right of priority under 35 U.S.C. § 371 to International Application No. PCT/US2021/015698 filed on Jan. 29, 2021, which claims priority to and the benefit of U.S. Provisional Patent Application No. 62/967,335, filed Jan. 29, 2020, which is hereby incorporated by reference in its entirety.

FIELD

The present disclosure relates generally to synthesizing imagery of a talking face from an audio signal. More particularly, the present disclosure relates to a framework for generating photorealistic three-dimensional (3D) talking faces conditioned, in some examples, only on audio input, and associated methods to optionally insert the generated faces into existing videos or virtual environments.

BACKGROUND

"Talking head" videos, consisting of closeups of a talking person, are widely used in newscasting, video blogs, online courses, etc. Other modalities, with similar frame composition focusing on faces, include face-to-face live chat and 3D game avatars.

The importance of the talking head synthesis has led to a variety of methods in the research literature. Many recent techniques use the approach of regressing facial motion from audio and use this to deform a single reference image of the desired subject. These approaches can inherit the realism of the reference photo. However, the results may lack geometric information and personalization, and do not necessarily reproduce 3D facial articulation and appearance with high fidelity. They also generally do not encompass lighting changes, and the fixed-viewpoint 2D approach restricts the possible applications.

Another body of research predicts 3D facial meshes from audio. These approaches are directly suitable for VR, games and other applications that require dynamic viewpoints, and dynamic lighting is also easy to accomplish. However, visual realism is often restricted by what can be obtained with real-time 3D rendering, and thus only game-quality results are achieved.

Other recent papers have presented techniques for generating talking head videos by transferring facial features, such as landmarks or blendshape parameters, from a different narrator's video onto the target subject. These techniques generate particularly impressive results, however they require a video of a surrogate actor. Furthermore, while text-based editing does not need a human actor, it relies on the availability of a time-aligned transcript.

SUMMARY

Aspects and advantages of embodiments of the present disclosure will be set forth in part in the following description, or can be learned from the description, or can be learned through practice of the embodiments.

One example aspect of the present disclosure is directed to a computing system to generate a talking face from an audio signal. The computing system can include one or more processors and one or more non-transitory computer-readable media that collectively store: a machine-learned face geometry prediction model configured to predict a face geometry based on data descriptive of an audio signal that comprises speech; a machine learned face texture prediction model configured to predict a face texture based on data descriptive of the audio signal that comprises the speech; and instructions that, when executed by the one or more processors, cause the computing system to perform operations. The operations can include obtaining the data descriptive of the audio signal that comprises speech; using the machine-learned face geometry prediction model to predict the face geometry based at least in part on the data descriptive of the audio signal; using the machine-learned face texture prediction model to predict the face texture based at least in part on the data descriptive of the audio signal; and combining the face geometry with the face texture to generate a three-dimensional face mesh model.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Overview

Figure 1A:
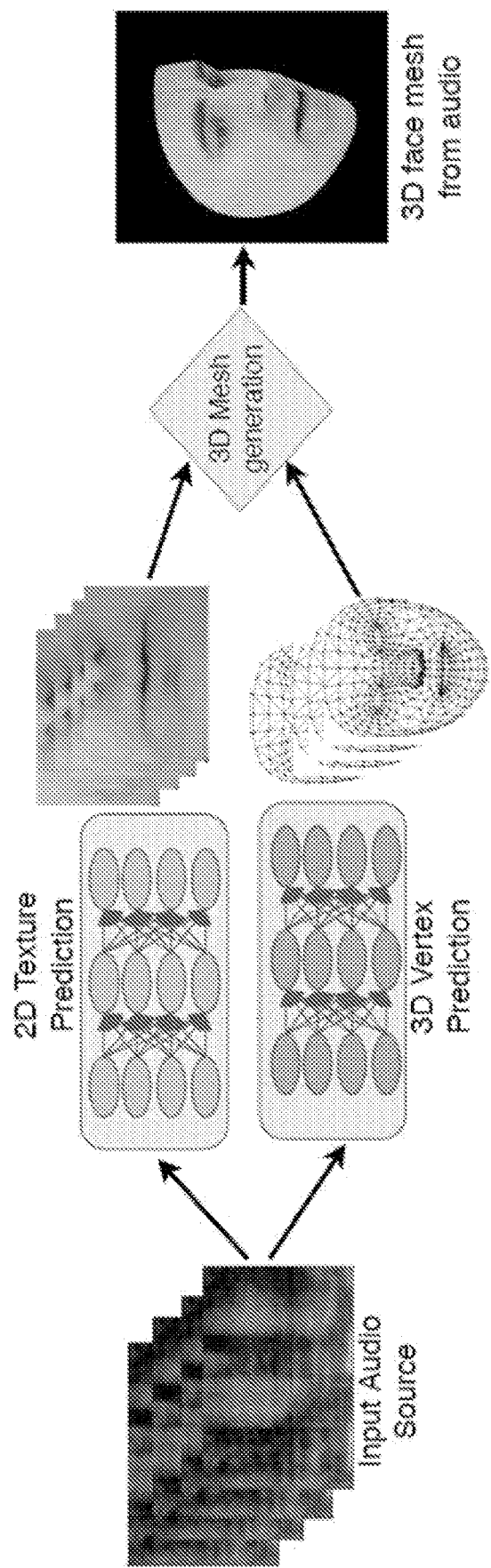
FIG. 1A shows a block diagram of an example system to generate a dynamically textured 3D face mesh from audio according to example embodiments of the present disclosure.

Generally, the present disclosure is directed to systems and methods for generating photorealistic 3D talking faces (e.g., a 3D textured mesh model of a face) conditioned, in some implementations, only on audio input. Specifically, some example implementations include and use a machine-learned face geometry prediction model to predict a face geometry based on the audio signal and a machine-learned face texture prediction model to predict a face texture based on the audio signal. The predicted geometry and texture can be combined to obtain the 3D mesh model of the face. In addition, the present disclosure provides associated methods to insert generated faces into existing videos or virtual environments.

In some implementations, machine-learned models used by the present disclosure can be trained on video data, including, for example, by decomposing faces from video into a normalized space that decouples 3D geometry, head pose, and texture. This allows separating the prediction problem into regressions over the 3D face shape and the corresponding 2D texture atlas, as described above.

Additional aspects of the present disclosure provide for improved quality of the generated faces. As one example, to stabilize temporal dynamics, some implementations of the present disclosure leverage an auto-regressive approach that conditions the model on its previous visual state. As another example, face illumination can be performed by the model using audio-independent 3D texture normalization. These techniques significantly boost the realism of generated sequences, providing results that outperform existing state-of-the-art lip-syncing systems.

A large number of different uses or applications exist for the generated talking faces. As examples, applications enabled by the proposed framework include: personalized and voice-controlled photorealistic talking game or virtual reality (VR) avatars; auto-translation of videos into different languages (e.g., lip-sync for translation and dubbing of videos in a new language); general video editing (e.g., inserting new audio/speech content in an educational video); and compression in multimedia communication (by transmitting only the audio signal (and, in some implementations, a reference image) and recreating the visual aspect from the audio when needed). Thus, in some example uses, the 3D information can be used to essentially edit a 2D video, producing photorealistic results. Alternately, the 3D mesh can be used for 3D games and VR.

More particularly, aspects of the present disclosure leverage machine learning techniques to train models that predict the shape and appearance of the face from instantaneous audio input. These models provide a practical framework that is applicable to a variety of scenarios, but also produces realistic enough results for real-world applications. To that end, the following optional characteristics are exhibited by various example implementations:

Audio as driving input: Some implementations of the present disclosure use audio as the driving input, which gives the flexibility to use the proposed techniques either with spoken input or synthesized text-to-speech (TTS) audio. Using audio directly also simplifies data preparation and model architecture, since one can directly use synchronized pairs of audio and video frames as training data, without any additional processing. On the other hand, using text, phonemes and visemes requires additional feature extraction and temporal alignment steps.

3D decomposition: A 3D face detector (one example is described in Kartynnik et al. Real-time facial surface geometry from monocular video on mobile gpus. In *Third Workshop on Computer Vision for AR/VR*, Long Beach, CA, 2019) to obtain the pose and a triangle mesh of the speaker's face in the video. This information enables the decomposition of the face into a normalized 3D mesh and texture atlas, thus decoupling head pose from speech-induced face deformations such as lip motion and teeth/tongue appearance. The models can be trained to predict the face geometry and texture from audio in this normalized domain. There are two benefits of this approach: (1) The degrees of freedom that the model has to cope with are greatly reduced (to speech-related features), which allows generating plausible models even from relatively short videos. (2) The model predicts a full 3D talking face instead of just a 2D image, which expands its applicability beyond video to gaming and VR, while also improving the quality and flexibility of video re-synthesis.

Personalized models: Personalized speaker-specific models can be trained, instead of building a single universal model to be applied across different people. While universal models have their merits, e.g., ease of reusability, they require larger training sets to fully capture the individual movement styles of every possible speaker. On the other hand, personalized models can easily incorporate such person-specific traits by learning the model from a video of a specific speaker during training. Note that once trained, such a model may still be used across different videos of the same speaker.

Temporally consistent photorealistic synthesis: Example implementations include model architectures which use an encoder-decoder framework that computes embeddings from audio spectrograms, and decodes them into 3D geometry and texture. In one example, a face geometry prediction model can predict face geometry, e.g., which can be expressed as mesh vertex deformations versus a reference mesh. Similarly, a face texture prediction model can predict the face appearance around the lip-region, e.g., which can be expressed as a difference map to a reference texture atlas.

In some implementations, to further achieve temporal smoothness, an auto-regressive framework can be used that conditions the texture generation both on the audio as well as previously generated texture outputs, resulting in visually stable sequences. In addition, when re-synthesizing video by blending the predicted faces into a target video, it is important to be consistent with the target face illumination. In some implementations this can be achieved by incorporating into the model(s) a 3D-normalized fixed texture atlas, which is uncorrelated with the audio signal, and acts as a proxy for instantaneous lighting.

The systems and methods of the present disclosure provide a number of technical effects and benefits. One example technical effect is the ability to convert arbitrary talking head video footage into a normalized space that decouples pose, geometry, and texture, which simplifies model architecture and training, and enables versatile high-quality results even with limited training data.

Another example technical effect is a novel approach that captures illumination of the face via audio-independent 3D texture normalization, and an auto-regressive texture prediction model for temporally smooth video synthesis. Thus, the techniques described herein enable the generation of imagery of talking faces from audio which is significantly more realistic.

Yet additional example technical effects are an end-to-end framework for training speaker-specific audio-to-face models, which can learn from a single video of the subject; and alignment, blending and re-rendering techniques for employing them in video editing, translation and 3D environments. The result is a photorealistic video or 3D face driven by audio only.

Another example technical effect and benefit provided by the techniques described herein is the ability to "compress" video of a speaker to an audio signal only while still being able to recreate a photorealistic representation of the visual aspects of the video. Specifically, a video can contain both audio data and visual data. Because the techniques of the present disclosure enable the (re-)creation of photorealistic imagery of a talking face from audio only, a video can be compressed by maintaining only the audio portion of the video (potentially along with a small number (e.g., 1) of reference images), which will greatly reduce the amount of data needed to store and/or transmit the video. Then, when the visual imagery of the talking face is desired, the techniques described herein can be employed to create the imagery from the audio signal. In such fashion, the amount of data needed to be able to store and/or transmit video of a talking face can be significantly reduced. For example, this compression scheme can have large benefits in video conferencing/chat use cases, particularly where network bandwidth is limited.

U.S. Provisional Patent Application No. 62/967,335, which is incorporated into and forms a portion of this disclosure, describes example implementations and experimental uses of the systems and methods described herein.

With reference now to the Figures, example embodiments of the present disclosure will be discussed in further detail.

Example Techniques for Generating Talking Faces

This section describes example approaches to predicting a dynamic 3D face model from audio input. This section first discusses example approaches for extracting training data from input video(s), and then details example neural network architectures and training methodologies used to predict both 3D geometry and the associated texture.

In some implementations, the audio channel from a training video can be extracted and transformed into frequency-domain spectrograms. For example, these audio spectrograms can be computed using Short-time Fourier transforms (STFT) with a Hann window function, over sliding windows 30 ms wide and 10 ms apart. These STFTs can be aligned with video frames and stacked across time to create a 256×96 complex spectrogram image, centered around each video frame. One or more machine-learned models can then predict the face geometry and texture for each frame based on the audio spectrogram.

For detecting faces in the training video, and obtaining 3D facial features, a face landmark detector can be used. Various facial landmark detectors (also known as three-dimensional face detectors) are known and available in the art. One example face landmark detector is described in Kartynnik et al. Real-time facial surface geometry from monocular video on mobile GPUs. In *Third Workshop on Computer Vision for AR/VR*, Long Beach, CA, 2019. This video-based face tracker detects 468 facial features in 3D, with the depth (z) component hallucinated based on deep learning; these are referred to as features or vertices interchangeably. Some implementations of the present disclosure define a fixed, predefined triangulation of these features, and represent any dynamic change in facial geometric shape entirely by mesh vertex displacements, and not by mesh topology changes.

Example Techniques for Normalizing Training Data

This section describes an example approach for normalizing input face data. One example goal is to eliminate the effects of head movement, and work with normalized facial geometry and texture. Both training and inference can take place in this normalized space, which greatly reduces the degrees of freedom that the models have to cope with, and as shown in U.S. Provisional Patent Application No. 62/967, 335, a few minutes (typically 2-5) of video footage of the target person, is usually sufficient to train the models to achieve high quality results.

Example Pose Normalization

First, one frame of the input video can be selected as a reference frame, and its respective 3D face feature points as reference points. The choice of frame is not critical; any frame where the face is sufficiently frontal and the resolution acceptable is suitable. Using the reference points, a reference cylindrical coordinate system with a vertical axis can be defined such that most face points are equidistant to the axis. The face size can then be normalized such that the average distance to the axis equals 1. The face points can be projected onto this reference cylinder, creating a 2D mapping of the reference face's surface, which can be used to 'unroll' its texture.

Next, for each frame of the training video, the 3D face points of the upper, more rigid parts of the face can be selected and aligned with corresponding points in the normalized reference. As one example, Umeyama's algorithm (Shinji Umeyama. Least-squares estimation of transformation parameters between two point patterns. *IEEE Trans. Pattern Anal. Mach. Intell.*, 13(4):376-380, 1991) can be used to estimate the rotation R, translation t and scale c in 3D. Appling $\hat{r}=cRp+t$ to tracked points p provides registered, normalized 3D face points suitable for training the face geometry prediction model.

In some implementations, for training the texture model, these normalized points, which are now registered with the cylindrical texture domain of the reference, can be used to create two projections of the each face's texture: (a) a "moving atlas", created by projecting the moving normalized points onto the reference cylinder as texture coordinates and rendering the associated triangles in 2D; hence the mouth texture resembles a frontal view with face features moving with the speech, and (b) a "fixed atlas", created by texture mapping each video triangle to the corresponding reference triangle using the latter's texture coordinates, hence face features are frozen in the locations defined by the reference.

Figure 2:
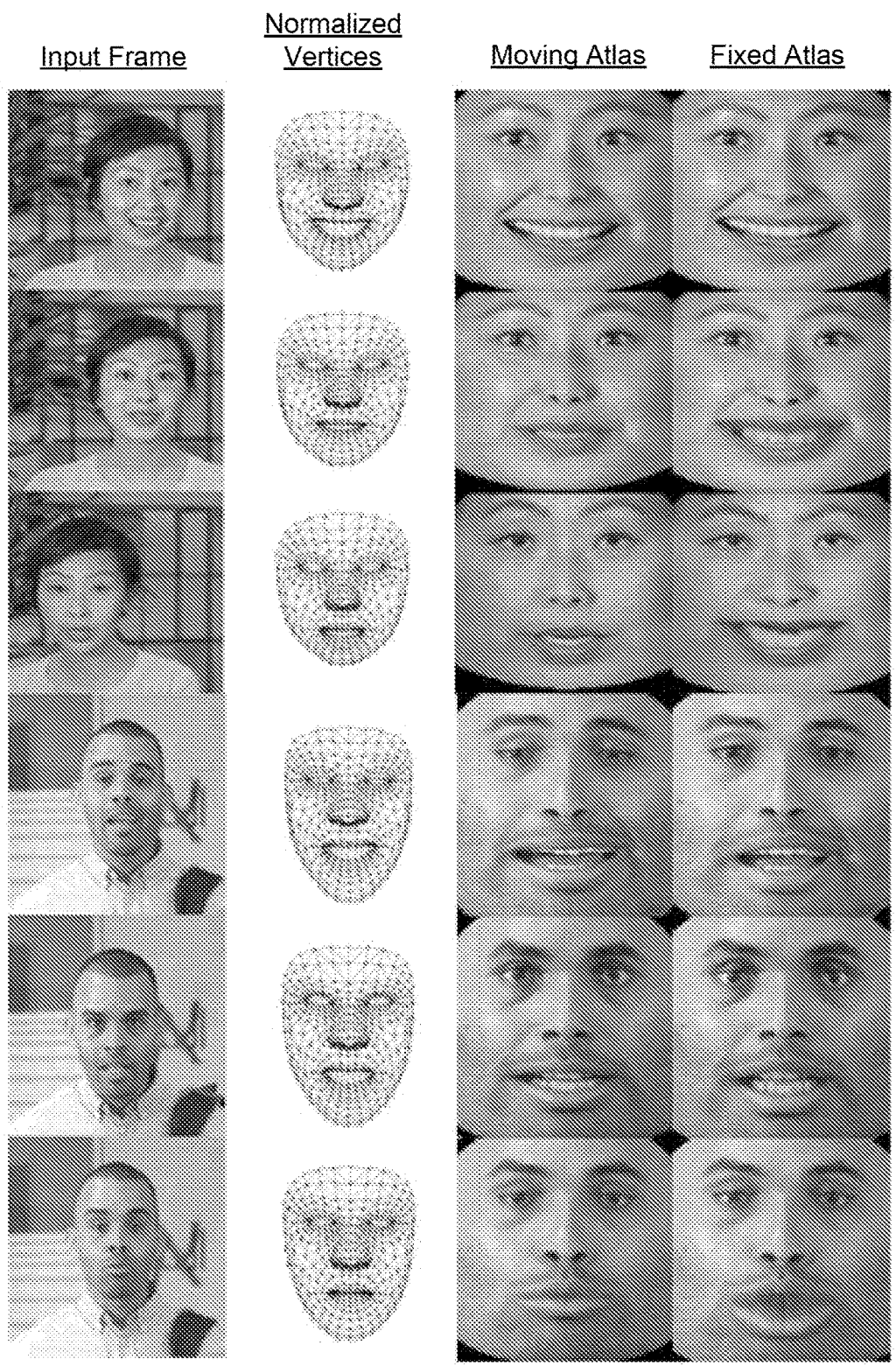
FIG. 2 depicts results of an example technique to normalize training data according to example embodiments of the present disclosure.

FIG. 2 demonstrates the effect of this normalization; as seen, the head pose is removed. While the moving atlas (third column) is more suitable for training lip shape and mouth interior appearance as a function of speech, the fixed atlas (fourth column) is useful for extracting lighting information, independent of speech, since the position of varying features such as mouth and eyes are fixed and can easily be masked out for lighting extraction.

Example Lighting Normalization

Another example aspect relates normalizing the frontalized texture atlas to remove lighting variations, mostly caused by head motion or changing illumination. One example lighting normalization algorithm of the present disclosure works in two phases. It first exploits facial symmetry to normalize the reference atlas R spatially, removing specularities and lighting variations that run across the face. It then performs a temporal normalization across video frames that transforms each frame's atlas F to match the illumination of R. The resulting atlases have a more uniform albedo-like appearance, which stays consistent across frames.

The temporal normalization algorithm is described first, as it is a core component also used during spatial normalization. This algorithm can assume that the two textures F and R are pre-aligned geometrically. However, any non-rigid facial movements, e.g. from speech, can result in different texture coordinates, and consequently, misalignments between R and F. Hence, a computing system implementing the algorithm first warps R to align it with F's texture coordinates, employing the same triangle-based warping algorithm used for frontalization.

Given the aligned R and F, a computing system implementing the algorithm can estimate a mapping that transforms F to match the illumination of R. This mapping can be composed of a smooth multiplicative pixel-wise gain G in the luminance domain, followed by a global channel-wise gain and bias mapping $\{a, b\}$ in the RGB domain. The resulting normalized texture $F^n$ can be obtained via the following steps:

$$(F_y; F_u; F_v) = RGBtoYUV(F); \quad (1)$$

$$F_y^l = G * F_y; \quad (2)$$

$$F^l = YUVtoRGB(F_y^l; F_u; F_v) \quad (3)$$

$$F^n = aF^l + b; \quad (4)$$

Gain Estimation: To estimate the gain G, observe that a pair of corresponding pixels at the same location k in F and R should have the same underlying appearance, modulo any change in illumination, since they are in geometric alignment. This albedo constancy assumption, if perfectly satisfied, yields the gain at pixel k as $G_k = R_k/F_k$. However, note that (a) G is a smoothly varying illumination map, and (b) albedo constancy may be occasionally violated, e.g. in non-skin pixels like the mouth, eyes and nostrils, or where the skin deforms sharply, e.g. the nasolabial folds. In some implementations, these factors can be accounted for by, firstly, estimating $G_k$ over a larger patch $p_k$ centered around k, and/or secondly, employing a robust estimator that weights pixels based on how well they satisfy albedo constancy. Example implementations of the present disclosure can formulate estimating $G_k$ as minimizing the error:

$$E_k = \sum_{j \in p_k} W_j \| R_j - G_k * F_j \|^2$$

where W is the per-pixel weights image. Example implementations can solve this error using iteratively reweighted least squares (IRLS). In particular, example implementations can initialize the weights uniformly, and then update them after each (ith) iteration as:

$$W_k^{i+1} = \exp\left(\frac{-E_k^i}{T}\right)$$

where T is a temperature parameter. The weights and gain can converge in 5-10 iterations; some implementations use T=0:1 and a patch size of 16×16 pixels for 256×256 atlases. In some implementations, pixels with large error $E_k$ can receive low weights, and implicitly interpolate their gain values from neighboring pixels with higher weights.

In some implementations, to estimate the global color transform $\{a,b\}$ in closed form, a computing system can minimize $\Sigma_k W_k \| R_k - aF_k - b \|^2$ over all pixels, with $W_k$ now fixed to the weights estimated above.

Reference Normalization: This section discusses how to spatially normalize the reference atlas by exploiting facial symmetry. Some example implementations first estimate the gain $G^m$ between the reference R and its mirror image R', using the algorithm described above. This gain represents the illumination change between the left and right half of the face. To obtain a reference with uniform illumination, a computing system can compute the symmetrized gain $G^s = \max(G^m, G^{m'})$, where $G^{m'}$ is the mirror image of $G^m$, i.e. for every symmetric pair of pixels, make the darker pixel match the brighter one. The normalized reference is then $G^m$. Note that the weighting scheme makes the technique robust to inherent asymmetries on the face, since any inconsistent pixel pairs will be down-weighted during gain estimation, thereby preserving those asymmetries.

Specularity Removal: Some example implementations remove specularities from the face before normalizing the reference and video frames, since they are not properly modeled as a multiplicative gain, and also lead to duplicate specularities on the reference due to symmetrization. Some example implementations model specular image formation as:

$$I = \alpha + (1-\alpha) * I_c$$

where I is the observed image, $\alpha$ is the specular alpha map and $I_c$ is the underlying clean image without specularities. Some example implementations first compute a mask, where $\alpha > 0$, as pixels whose minimum value across RGB channels in a smoothed I exceeds the 90th percentile intensity across all skin pixels in I. Some example implementations use the face mesh topology to identify and restrict computation to skin pixels. Some example implementations then estimate a pseudo clean image $\tilde{I}_c$ by hole-filling the masked pixels from neighboring pixels, and use it to estimate $\alpha = (I - \tilde{I}_c)/(1 - \tilde{I}_c)$. The final clean image is then $I_c = (I-\alpha)/(1-\alpha)$. Note that the soft alpha computation elegantly handles any erroneous over-estimation of the specularity mask.

Example Techniques for Audio to Face Geometry Synthesis

Some example implementations of the present disclosure use complex Fourier spectrograms directly as the input, hence simplifying the overall algorithm. Specifically, in some example implementations, the time-shifted complex spectrogram can be represented as a 256×96×2 (frequency×time×real/imaginary) input vector to a 12 layer deep encoder network, where the first 6 layers apply 1D convolutions over frequencies (kernel 3×1, stride 2×1), and the subsequent 6 layers apply 1D convolution over time (kernel 1×3, stride 1×2), all with leaky ReLU activation, intuitively corresponding to phoneme detection and activation, respectively. The resulting latent space has 256 dimensions. In some implementations, an additional single dimension from an eye blink detector can be added, to be able to detect blinks during training and generate them on demand during inference. The decoder follows, and one example decoder can include two fully connected layers with 150 and 1404 units, and linear activations. These can be thought of a mapping of speech to a linear "blendshape" facial representation with 468 vertices (1404=468×3 coordinates). Some example implementations also include a dropout layer between each of the layers above. In some implementations, the last layer can be initialized using PCA over the vertex training data. One example loss function includes an $L_2$ vertex position loss; a regularization loss; and/or a velocity loss.

Example Techniques for Audio to Texture Synthesis

Figure 3A:
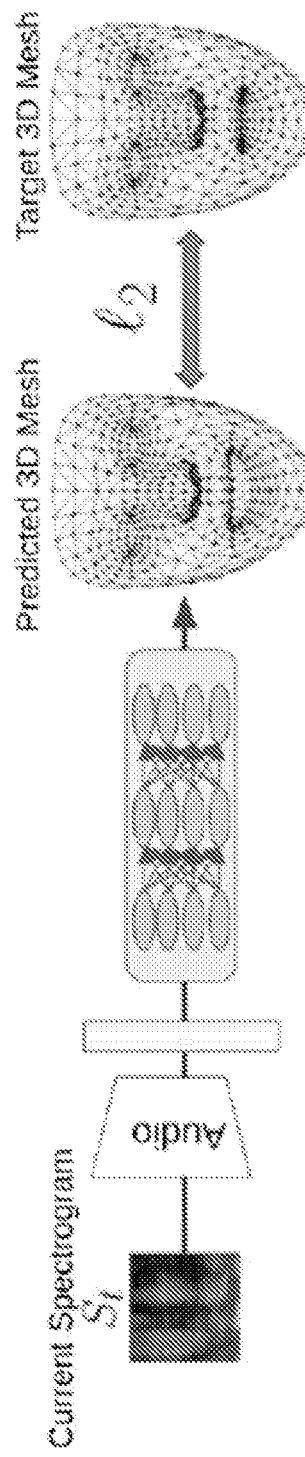
FIG. 3A shows a block diagram of an example system to train a machine-learned face geometry prediction model according to example embodiments of the present disclosure.
Figure 3B:
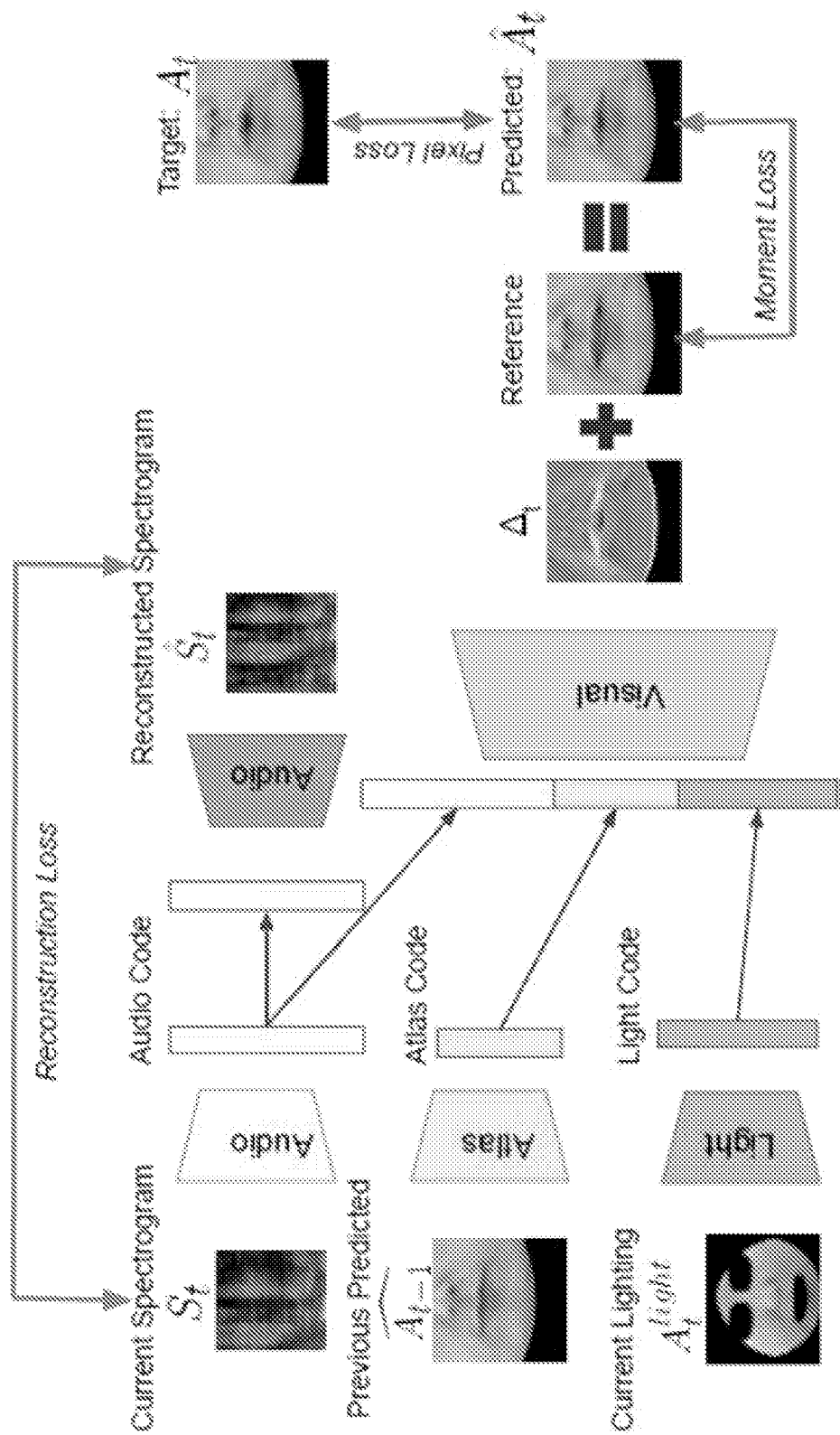
FIG. 3B shows a block diagram of an example system to train a machine-learned face texture prediction model according to example embodiments of the present disclosure.

This section describes an example framework for learning a function G to map from domain S of audio spectrograms to domain T of moving texture atlas images; G: S→T. In some implementations, for the purpose of texture prediction, the atlases can be cropped to a region around the lips (e.g., to a 128×128 region), and references to textures in this section imply the cropped atlases. FIG. 3B illustrates an example of the texture model and training pipeline.

The input at time instant t is a complex spectrogram, $S_t \in \mathbb{R}^{256 \times 96 \times 2}$ and the output is a difference map, $\Delta_t$, which is added to the reference atlas, $I_r$, to get the predicted textured atlas, $\hat{A}_t \in \mathbb{R}^{128 \times 128 \times 3}$.

Some implementations of the present disclosure follow an encoder-decoder architecture for realizing G(•). First, the spectrogram can be processed through a series of convolutional layers to yield a latent code, $L_t^S \in \mathbb{R}^{N_L}$, where $N_L$ is the latent code dimension. Next, the latent code is spatially distributed and progressively up-sampled with convolutional and interpolation layers to generate the textured output. The model(s) implementing G can be trained to minimize the combined loss, $R=R_{pix}+\alpha R_{mom}$, which is composed of $$R_{pix}=d(A_t,\hat{A}_t), \quad (1)$$

where $A_t$ is the ground truth atlas corresponding to $S_t$, and d is a pixel-level distance measure, and $$R_{mom}=|\mu(I_r^m)-\mu(\hat{A}_t^m)|+|\sigma(I_r^m)-\sigma(\hat{A}_t^m)|, \quad (2)$$

where $\mu(\bullet)$ and $\sigma(\bullet)$ are the mean and standard deviation, and $I_r^m = M \circ I_r$ and $\hat{A}_t^m = M \circ \hat{A}_t$ are obtained by applying a binary mask M to the respective atlases, which zeros out the mouth region, leaving only skin pixels.

The pixel-loss $R_{pix}$, aims to maintain pixel-level similarity between the predicted and ground truth textures. Example different variants of d(•) can include the $\ell_1$ loss, Structural Similarity Loss (SSIM), and Gradient Difference Loss (GDL) (Mathieu et al., Deep multi-scale video prediction beyond mean square error. ICLR, 2016.)

The moment-loss term $R_{mom}$, encourages the first- and second-order moments of the distributions of skin pixels to match. This imposes a soft constraint on $\hat{A}_t$ to adhere to the overall illumination of the reference frame, and makes the training less sensitive to illumination changes across time. Masking away the mouth region ensures that appearance changes inside the mouth due to speech do not affect the moments computation.

Another example aspect is directed to a blendshape decoder. For example, to animate CGI characters using audio, some example implementations can optionally include another decoder in the network that predicts blendshape coefficients $B_t$ in addition to geometry and texture. For training, these blendshapes can be derived from vertices $V_t$ by fitting them to an existing blendshapes basis either via optimization or using a pre-trained model. Some example implementations can use a single fully connected layer to predict coefficients $\widehat{B_t}$ from audio code $L_t^s$, and train it using $\ell_1$ loss $R_{bs}=\|B_t-\widehat{B_t}\|_1$ to encourage sparse coefficients.

Example Techniques for Auto-Regressive Texture Synthesis

Predicting talking faces from audio can suffer from ambiguities caused by changes in facial expressions while speaking, or even while silent. In the latter case, for example, the model can map subtle noise in the audio channel to the different expressions, leading to disturbing uttering artifacts.

While some implementations of the present disclosure do not explicitly model facial expressions, this issue can be mitigated by incorporating memory into the network. The current output of the network (at time t) can be conditioned not only on $S_t$ but also on the predicted atlas, $\hat{A}_{t-1}$, generated at the previous time step. $\hat{A}_{t-1}$ is encoded as a latent code, $L_{t-1}^A \in \mathbb{R}^{N_A}$, e.g., using a cascade of 3×3 convolutions with a stride of 2 pixels. $L_t^S$ and $L_{t-1}^A$ can be combined and passed on to a decoder network to generate the current texture, $\hat{A}_t$.

Note that the previous predicted atlas is, in some instances, not available during training, unless it is modeled as a true recurrent network. However, the network can be trained satisfactory by using a technique called "Teacher Forcing", where the ground truth atlas from the previous frame is served as the predicted input during training. This auto-regressive (AR) approach appreciably improves the temporal consistency of synthesized results.

Example Techniques for Joint Texture and Spectrogram Reconstruction

Some example implementations of the framework described so far do not explicitly enforce the ability to reconstruct input spectrograms from the latent domain. While such a constraint is strictly not needed for inference of lip shapes, it can be help with regularization and generalizability, by forcing the latent domain to span the manifold of valid spectrograms. To accomplish this, some implementations of the present disclosure include an additional audio decoder that reconstructs the input spectrogram from the same shared latent code, $L_t^S$, used for generating $\hat{A}_t$. The additional auto-encoder loss $R_{ae}$ for the predicted spectrogram $\hat{S}_t$ is given by $$R_{ae}=\|\hat{S}_t-S_t\|_2. \quad (3)$$

Example Techniques for Matching Target Illumination

For the purpose of blending the synthesized texture back into a target video (see Section 3.5), it is desirable that the synthesis be consistent with the illumination of the target face. The functional mapping, G:S→T does not incorporate any such lighting information. The moment-loss $R_{mom}$, imposes a soft constraint to respect the overall illumination of the reference frame. However, the instantaneous lighting on the target face can be considerably different from the reference, and also change over time. This can lead to inconsistent results even when using advanced techniques like Poisson blending (Perez et al. Poisson image editing. ACM Trans. Graph., 22(3):313-318, July 2003).

This issue can be addressed by using the (e.g., uncropped) fixed atlas, $A_t^{fix}$ as a proxy lighting map. Similar to the moment-loss computation, the eye and mouth regions from $A_t^{fix}$ can be masked out to leave only the skin pixels. The intensity of skin pixels on $A_t^{fix}$ is independent of the input spectrogram, and changes mainly due to lighting or occlusion. Thus, $A_t^{light} = M \circ A_t^{fix}$, where M is the binary mask, encodes a measure of the instantaneous illumination. Hence, it can be referred to as the lighting atlas. Next, $A_t^{light}$ is encoded with a lighting encoder network $E^{light}$ resulting in a lighting code, $L_t^{\ell} \in \mathbb{R}^{N_{\ell}}$. Note that in some implementations, the masked reference atlas can be subtracted from $A_t^{light}$ before feeding it to the network to treat the reference as neutral (zero) illumination.

In some implementations, transformation matrices can be used instead or in addition to the lighting atlas as the proxy for lighting.

Finally, all the three latent codes, $L_t^S$ (spectrogram), $L_{t-1}^A$ (previous predicted atlas) and $L_t^{\ell}$ (lighting) can be combined and passed to a joint visual decoder, as shown in FIG. 3B, to generate the output texture. The entire framework can be trained end-to-end with the combined loss:

$$R = R_{pix} + \alpha_1 R_{mom} + \alpha_2 R_{ae}, \quad (4)$$

where $\alpha_1$ and $\alpha_2$ control the importance of the moment-loss and spectrogram auto-encoder loss, respectively.

Example Techniques for 3D Mesh from Predicted Geometry and Texture

The previous subsections have detailed examples of how to predict both texture and geometry. However, since the predicted texture is a "moving atlas", i.e. a projection onto the reference cylinder, it typically will be back-projected onto the actual mesh in order to use it for a 3D head model. Fortunately, this can be achieved without any resampling, by simply projecting the corresponding predicted vertices onto the reference cylinder, and using their 2D location as new texture coordinates. Note that using a moving atlas plus a reprojection has two additional advantages: (a) it can mask small discrepancies between predicted vertices and predicted texture; and (b) it results in a more uniform texture resolution on the mesh, since in the size of triangles in the synthesized atlas closely corresponds to their surface area in the mesh. In conjunction with the predefined triangle topology, the result is a fully textured 3D face mesh, driven by audio input, as shown in the flow chart of FIG. 1A. In some implementations, the input audio source can be encoded into an encoded representation using an audio encoder prior to 2D texture prediction and 3D vertex prediction.

Example Techniques for Inserting the Predicted Face Mesh into Videos

Figure 1B:
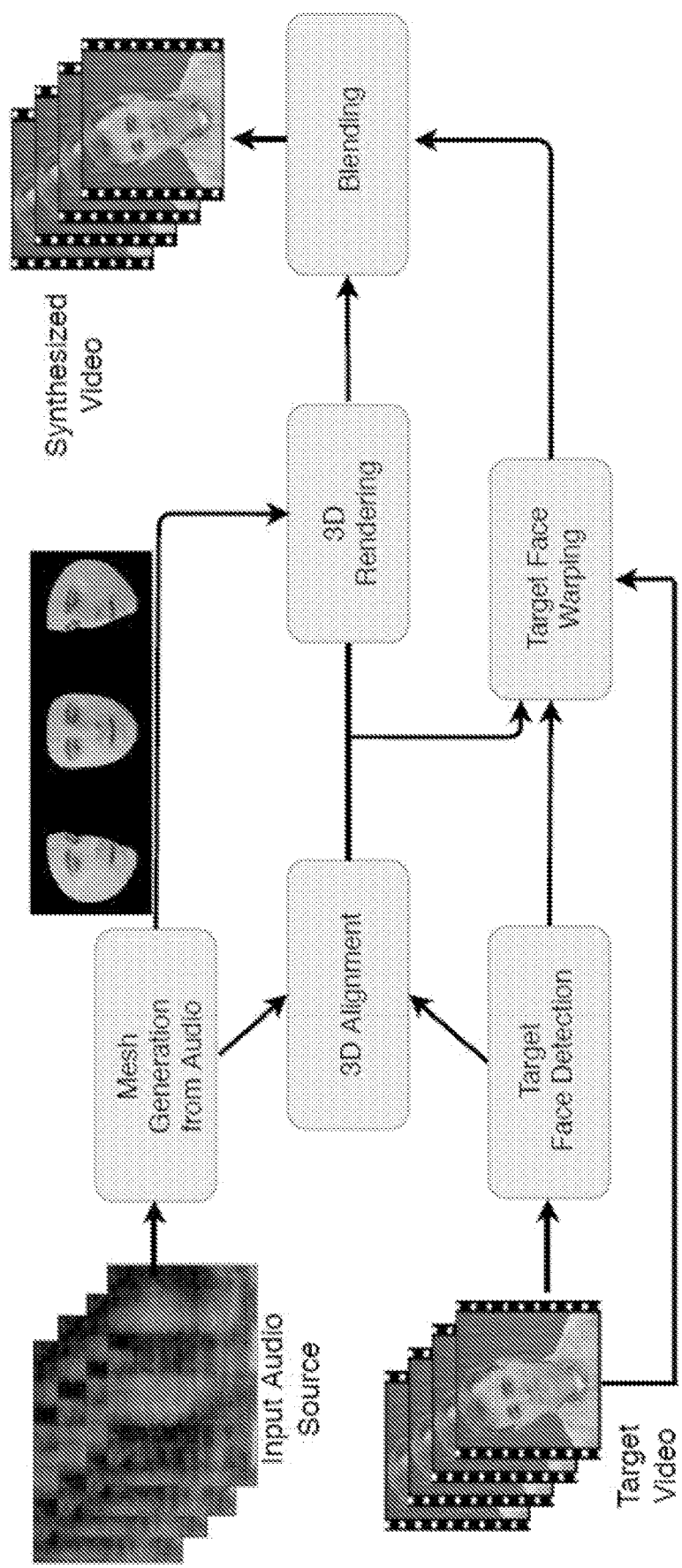
FIG. 1B shows a block diagram of an example system to insert a generated face mesh into a target video in order to create a synthesized talking head video from a new audio input according to example embodiments of the present disclosure.

The normalization transforms from video to reference are invertible and thus can be used to insert the audio-generated faces into a target video, thereby synthesizing talking head videos, as depicted via the flow chart in FIG. 1B.

More specifically, given a target video, lighting and face pose can be extracted for each frame and employed during texture synthesis and 3D rendering, respectively, when synthesizing a face from a new audio track. In some implementations, only the speech-affected areas of the lower face are rendered, e.g., below the mid-nose point. This is because some example current texture models do not generate varying eye gaze or blinks, and would thus result in a glass-eyed look for the upper face. However, one caveat is that the target frame's upper face and areas below the chin are not necessarily consistent with the newly generated face. In particular, if in the target frame, the original mouth was open wider than the synthesized frame, simply rendering the new face into the frame could result in a double-chin.

Hence, each target frame can be pre-processed by warping the image area below the original chin to match the expected new chin position. In order to avoid seams at border areas, a gradually blended mix can be created between the original and new face geometry and the original face in the target frame can be warped according to the blended geometry. Finally, Poisson blending (Perez et al. Poisson image editing. ACM Trans. Graph., 22(3):313-318, July 2003) can be used to eliminate any remaining color differences and blend the rendered face view into the warped target frame.

Example Methods

Figure 6:
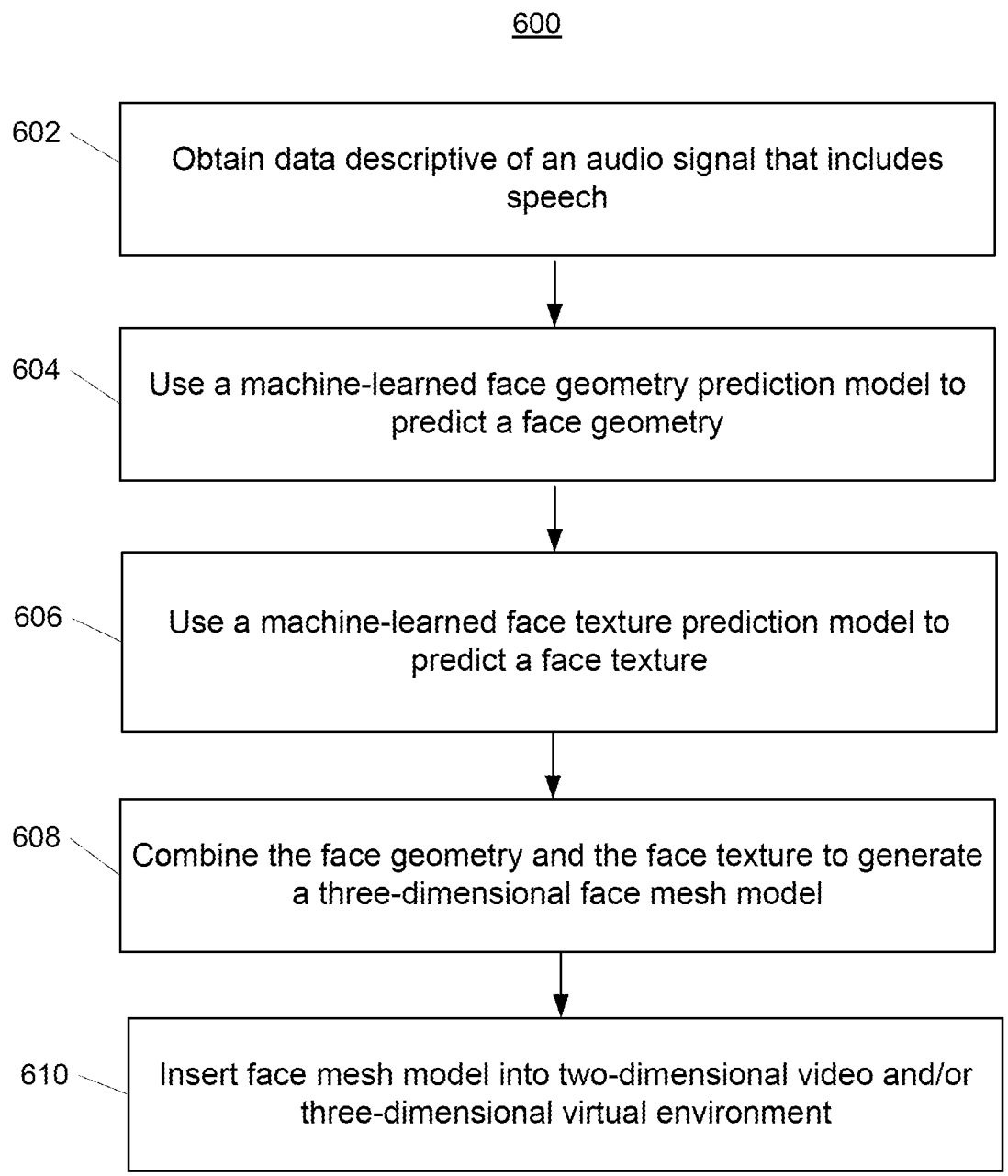
FIG. 6 depicts a flow chart diagram of an example method to generate a talking face from audio according to example embodiments of the present disclosure.

FIG. 6 depicts a flow chart diagram of an example method 600 to generate a talking face from audio according to example embodiments of the present disclosure.

At 602, a computing system can obtain data descriptive of an audio signal that includes speech.

In some implementations, the audio signal is a standalone audio signal that is independent of a visual representation of the speech. In other implementations, the audio signal is associated with a visual representation of the speech.

In some implementations, the audio signal comprises recorded human audio utterances. In some implementations, the audio signal comprises synthesized text-to-speech audio generated from textual data.

At 604, the computing system can use a machine-learned face geometry prediction model to predict a face geometry.

At 606, the computing system can use a machine-learned face texture prediction model to predict a face texture.

In some implementations, the machine-learned face texture prediction model is an auto-regressive model that, for each of a plurality of iterations, receives as input a previous iterative prediction of the machine-learned face texture prediction model.

In some implementations, the predicted face texture is a combination of a difference map predicted by the machine-learned face texture prediction model and a reference texture atlas.

In some implementations, the machine-learned face geometry prediction model and the machine learned face texture prediction model are personalized models that are specific to a speaker of the speech included in the audio signal.

In some implementations, the face geometry predicted based at least in part on the data descriptive of the audio signal is predicted within a normalized three-dimensional space associated with a three-dimensional mesh; and the face texture predicted based at least in part on the data descriptive of the audio signal is predicted within a normalized two-dimensional space associated with a two-dimensional texture atlas.

At 608, the computing system can combine the face geometry and the face texture to generate a three-dimensional face mesh model.

At 610, the computing system can insert the face mesh model into a two-dimensional video and/or three-dimensional virtual environment.

For example, the face mesh model can be inserted into a two-dimensional target video to generate a synthesized video. For example, inserting the three-dimensional face mesh model into the two-dimensional target video can include: obtaining the two-dimensional target video; detecting a target face in the two-dimensional target video; aligning the three-dimensional face mesh with the target face at a target position; and/or rendering the three-dimensional face mesh within the two-dimensional target video at the target position to generate the synthesized video.

In some implementations, inserting the three-dimensional face mesh model into the two-dimensional target video can include: generating a fixed atlas from the two-dimensional target video; and/or providing the fixed atlas to the machine-learned face texture prediction model as a proxy lighting map.

In some implementations, detecting the target face can include: using a three-dimensional face detector to obtain a pose and a triangle mesh of the target face in the video; and/or decomposing the target face into a three-dimensional normalized space associated with a three-dimensional mesh and a two-dimensional normalized space associated with a two-dimensional texture atlas. In some implementations, the face geometry predicted based at least in part on the data descriptive of the audio signal is predicted within the normalized three-dimensional space associated with the three-dimensional mesh. In some implementations, the face texture predicted based at least in part on the data descriptive of the audio signal is predicted within the normalized two-dimensional space associated with the two-dimensional texture atlas.

Figure 7A:
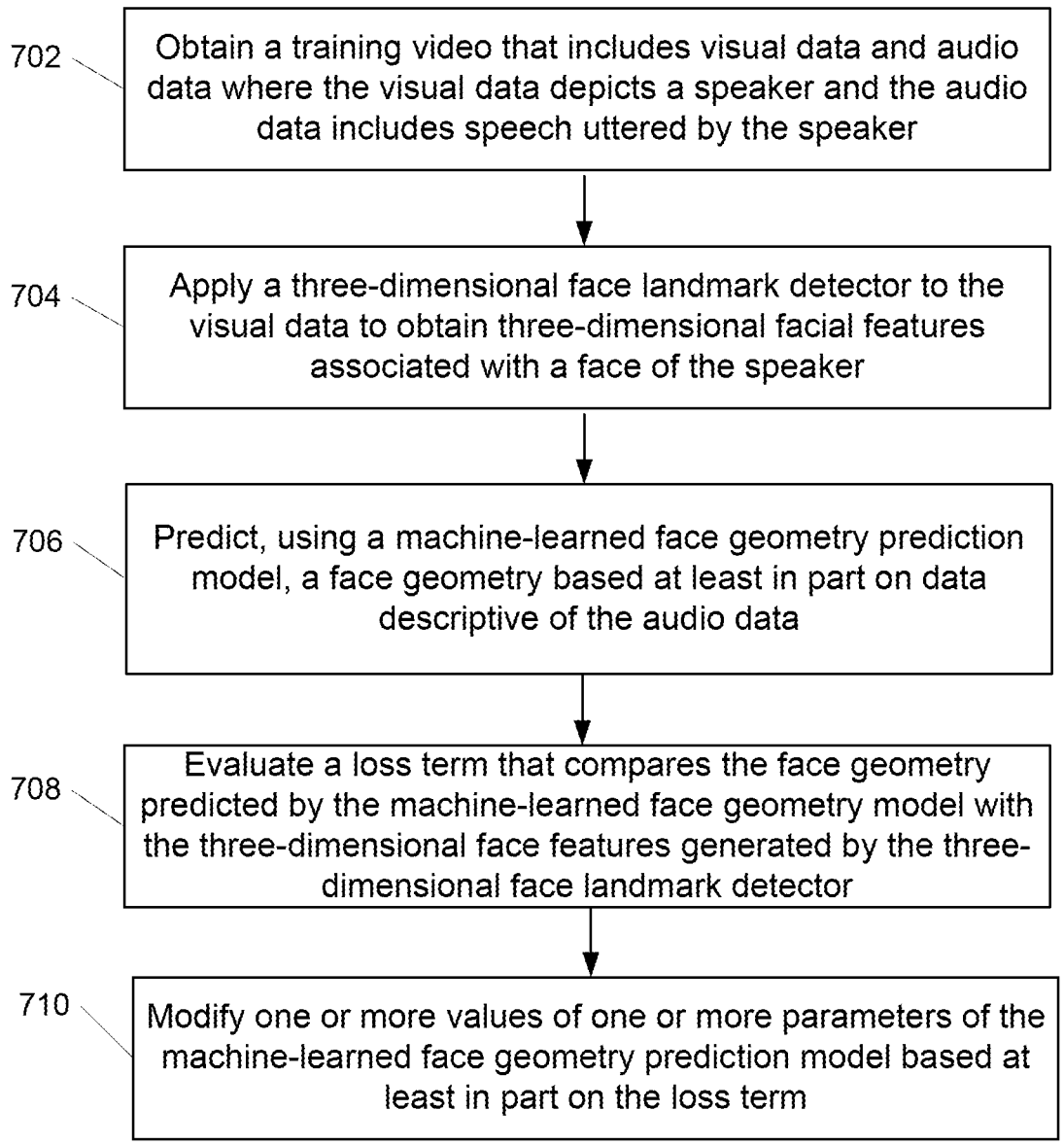
FIG. 7A depicts a flow chart diagram of an example method to train a machine-learned face geometry prediction model according to example embodiments of the present disclosure.

FIG. 7A depicts a flow chart diagram of an example method 700 to train a machine-learned face geometry prediction model according to example embodiments of the present disclosure.

At 702, a computing system can obtain a training video that includes visual data and audio data where the visual data depicts a speaker and the audio data includes speech uttered by the speaker.

At 704, the computing system can apply a three-dimensional face landmark detector to the visual data to obtain three-dimensional facial features associated with a face of the speaker.

At 706, the computing system can predict, using a machine-learned face geometry prediction model, a face geometry based at least in part on data descriptive of the audio data.

At 708, the computing system can evaluate a loss term that compares the face geometry predicted by the machine-learned face geometry model with the three-dimensional face features generated by the three-dimensional face landmark detector.

At 710, the computing system can modify one or more values of one or more parameters of the machine-learned face geometry prediction model based at least in part on the loss term.

Figure 7B:
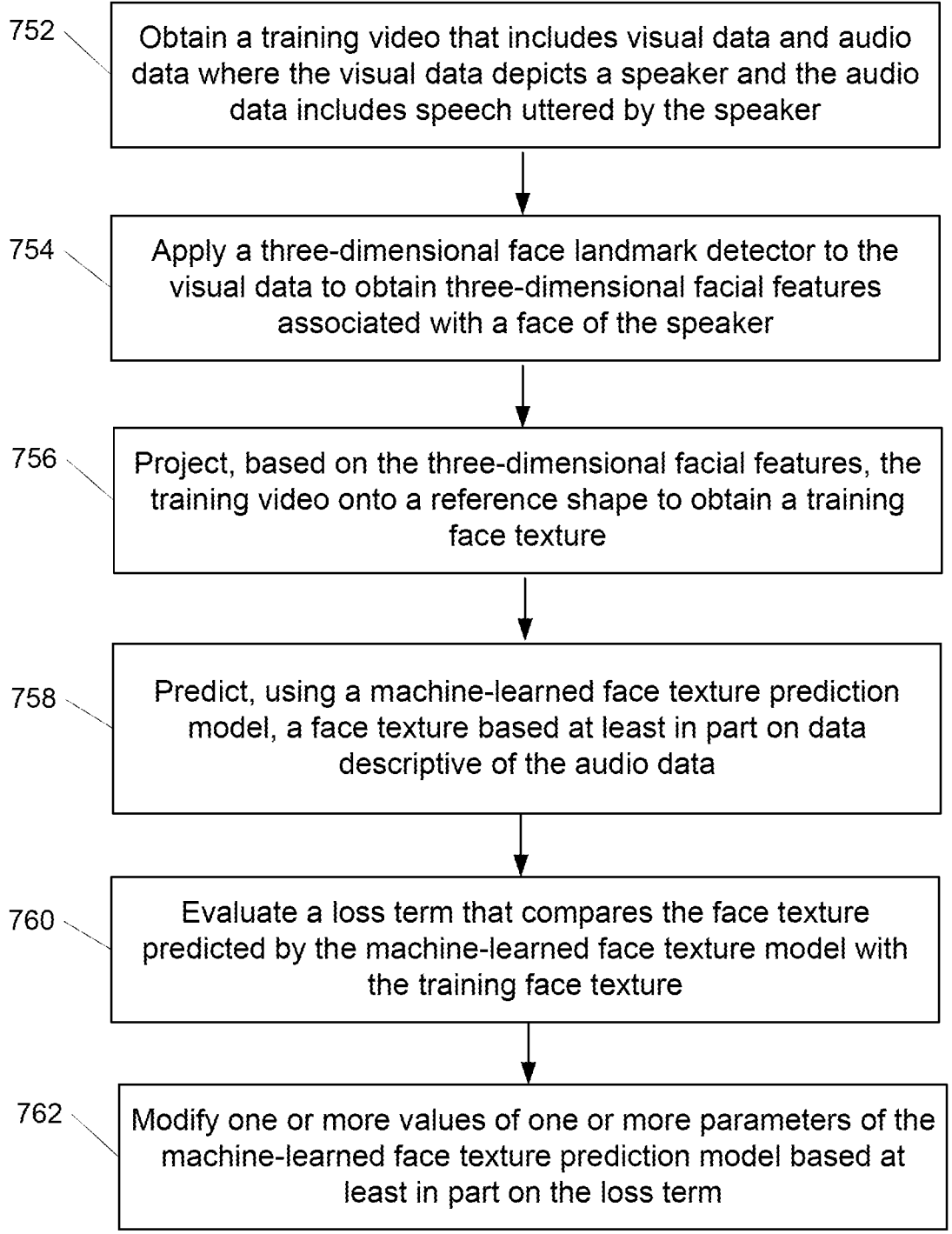
FIG. 7B depicts a flow chart diagram of an example method to train a machine-learned face texture prediction model according to example embodiments of the present disclosure.

FIG. 7B depicts a flow chart diagram of an example method 750 to train a machine-learned face texture prediction model according to example embodiments of the present disclosure. Method 750 can be performed separately from method 700 or simultaneously/jointly with method 700.

At 752, a computing system can obtain a training video that includes visual data and audio data where the visual data depicts a speaker and the audio data includes speech uttered by the speaker.

At 754, the computing system can apply a three-dimensional face landmark detector to the visual data to obtain three-dimensional facial features associated with a face of the speaker.

At 756, the computing system can project, based on the three-dimensional facial features, the training video onto a reference shape to obtain a training face texture.

At 758, the computing system can predict, using a machine-learned face texture prediction model, a face texture based at least in part on data descriptive of the audio data.

In some implementations, the method can further include generating a fixed atlas from the training video; and/or inputting the fixed atlas into the machine-learned face texture prediction model to serve as a proxy lighting map. In some implementations, generating the fixed atlas can include: projecting the training video onto the reference shape using fixed reference facial coordinates; and/or masking pixels that correspond to eye and inner mouth regions.

At 760, the computing system can evaluate a loss term that compares the face texture predicted by the machine-learned face texture model with the training face texture.

At 762, the computing system can modify one or more values of one or more parameters of the machine-learned face texture prediction model based at least in part on the loss term.

Example Applications

So far, the proposed methodology for creating 3D talking faces from audio input has been described. This section discusses some sample applications of this technology. The approach of generating fully textured 3D geometry enables a broader variety of applications than purely image-based or 3D-only techniques.

Example Photorealistic Talking Faces for Games and VR

Figure 4:
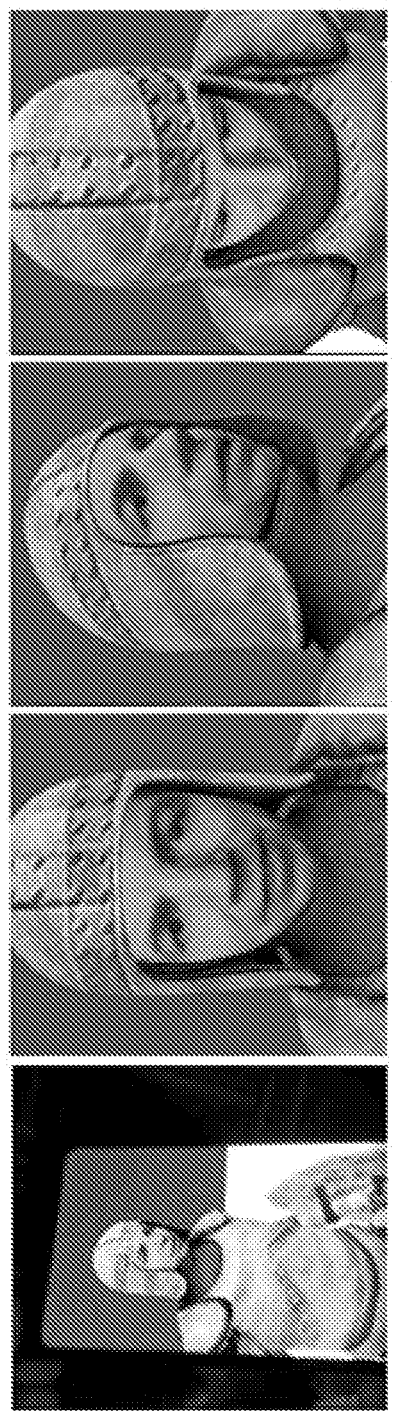
FIG. 4 depicts examples of a talking face integrated into a virtual environment according to example embodiments of the present disclosure.

There is an increasing demand for look-alike avatars in modern multiplayer online games and Virtual Reality (VR), to make the gaming environment more social and engaging. While such avatars may be driven by a video feed from a web-cam (at least for seated experiences), the ability to generate a 3D talking face from just audio obviates the need for any auxiliary camera device, and as a side effect preserves home privacy. Moreover, it can reduce bandwidth, and (in conjunction with voice translation) even allow players to interact regardless of their language. FIG. 4 shows an audio-only generated 3D face integrated into a demo game. The model in this case was trained from about six minutes of offline web-cam footage of the subject.

FIG. 4: Screenshots of a mobile app in which a talking face, driven by audio only, is integrated into a demo game. Since a full 3D face model is generated, the face can be rendered from any viewpoint during game-play.

Video Editing, Translation and Dubbing

Another important class of applications is re-synthesis of video content. With the techniques described herein, a given video of the subject can be modified to match a new soundtrack. This can be used in a variety of scenarios:

Video creation and editing: New content can be inserted to update or augment an online course, or to correct an error, without the cumbersome and sometimes impossible procedure of re-shooting the whole video under original conditions. Instead, the subject only needs to record a new audio for the edited portion, and apply our synthesis to modify the corresponding video segment. Extrapolating further, an existing video can be used only as a generic background to create entirely new, different content driven by audio or text, hence enabling a speech-to-video or text-to-video system.

Video translation and dubbing: Even though certain example models used for experimentation were trained mostly on English videos, it turns out empirically that they are surprisingly robust to both different languages as well as TTS audio at inference time. Using available transcripts or a speech recognition system to obtain captions, and subsequently a text-to-speech system to generate audio, example implementations can automatically translate and lip-sync existing videos into different languages. In conjunction with appropriate video re-timing and voice-cloning, the resulting videos look fairly convincing. Notably, in contrast to narrator-driven techniques, the approach for video dubbing enabled hereby does not require a human actor in the loop, and is thus immediately scalable across languages.

Additional Example Use Cases

Many additional use cases or applications are possible. One additional example is 2D or 3D cartoon talking avatars, powered by audio. For example, an additional layer can be used to map predicted geometry to animated character's control knobs such as blendshapes.

Another example application is video compression for face chat and/or convert audio calls into talking faces. For example, a computing system (e.g., a receiving computing system) can reconstruct faces from audio and (if needed) other metadata such as expression, lighting etc.

Another example application is for generating visualizations for a virtual assistant. For example, a computing system can operate to give a face to the assistant which can be shown as a visual display such as a Google Home. Expressions can also be added.

Example Devices and Systems

Figure 5A:
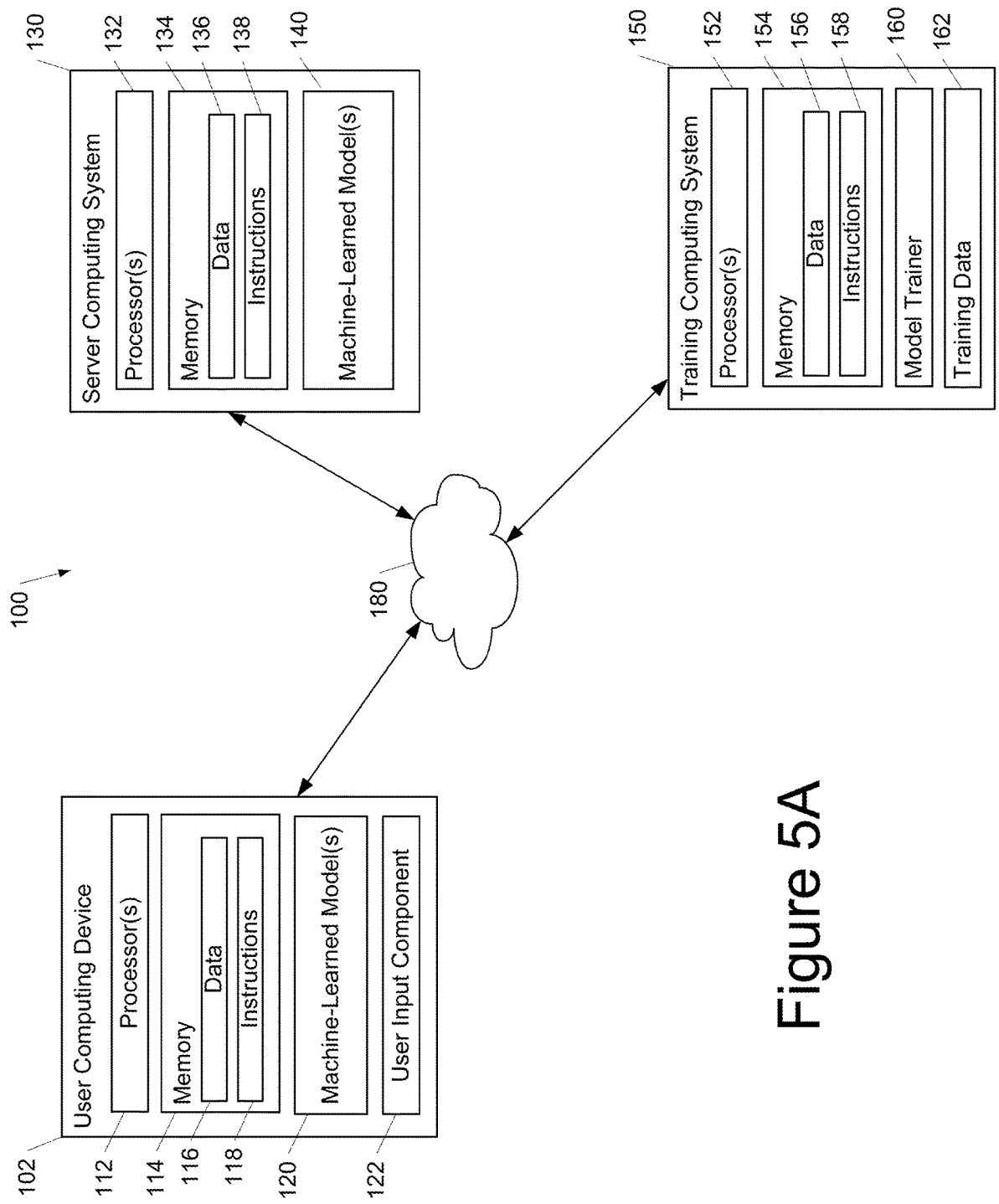
FIGS. 5A-C depicts block diagrams of example computing systems according to example embodiments of the present disclosure.

FIG. 5A depicts a block diagram of an example computing system 100 that according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more machine-learned models 120. For example, the machine-learned models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Example machine-learned models 120 are discussed with reference to FIGS. 1A-4.

In some implementations, the one or more machine-learned models 120 can be received from the server computing system 130 over network 180, stored in the user computing device memory 114, and then used or otherwise implemented by the one or more processors 112. In some implementations, the user computing device 102 can implement multiple parallel instances of a single machine-learned model 120 (e.g., to perform in parallel across multiple instances).

Additionally or alternatively, one or more machine-learned models 140 can be included in or otherwise stored and implemented by the server computing system 130 that communicates with the user computing device 102 according to a client-server relationship. For example, the machine-learned models 140 can be implemented by the server computing system 140 as a portion of a web service (e.g., a face synthesis service). Thus, one or more models 120 can be stored and implemented at the user computing device 102 and/or one or more models 140 can be stored and implemented at the server computing system 130.

The user computing device 102 can also include one or more user input component 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Example models 140 are discussed with reference to FIGS. 1A-4.

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. For example, a loss function can be back-propagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated back-propagation through time. The model trainer 160 can perform a number of generalization techniques (e.g., weight decays, dropouts, etc.) to improve the generalization capability of the models being trained.

In particular, the model trainer 160 can train the machine-learned models 120 and/or 140 based on a set of training data 162. The training data 162 can include, for example, existing videos that depict speech.

In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 5A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 5B:
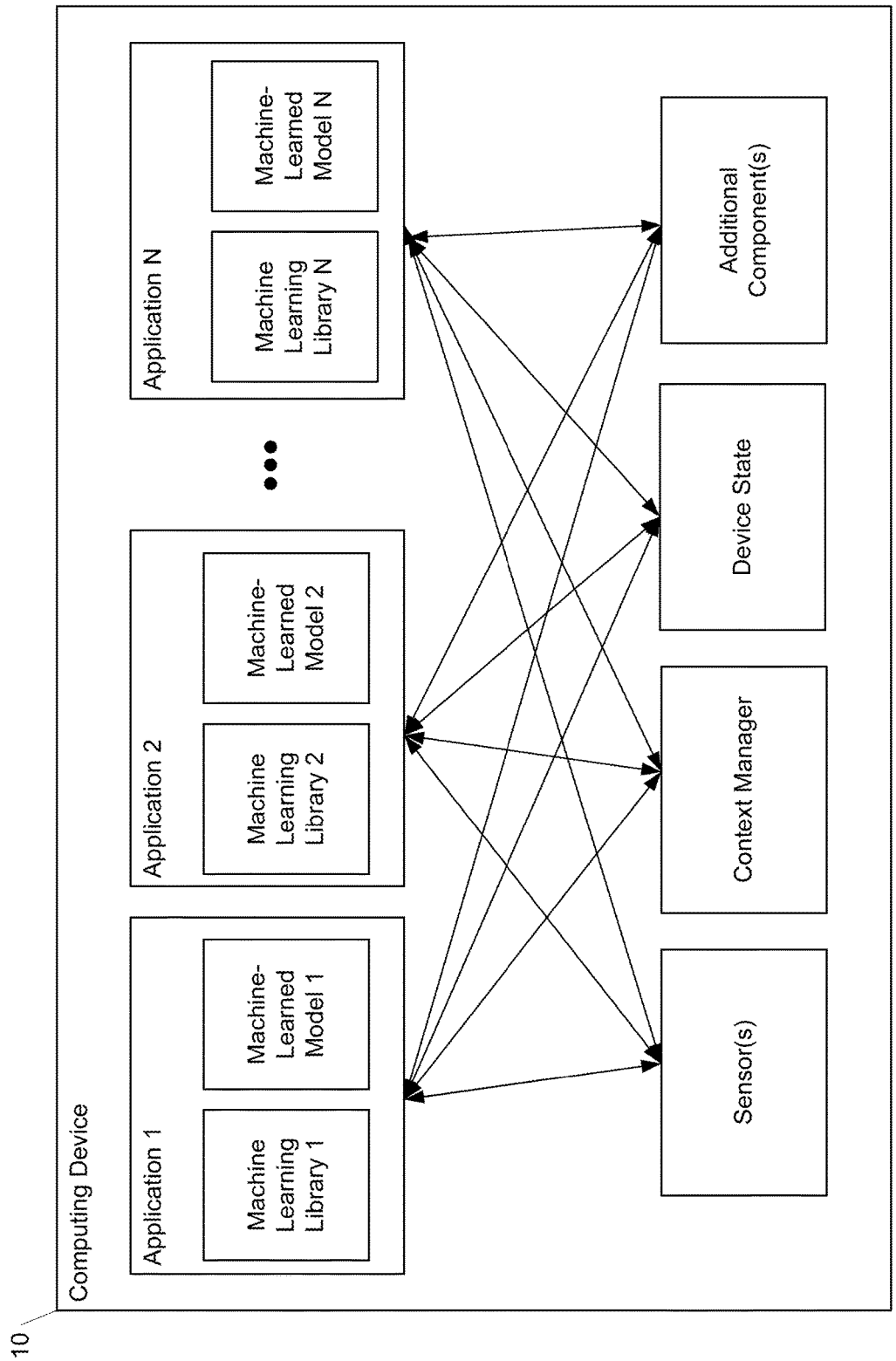

FIG. 5B depicts a block diagram of an example computing device 10 that performs according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 5B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 5C:
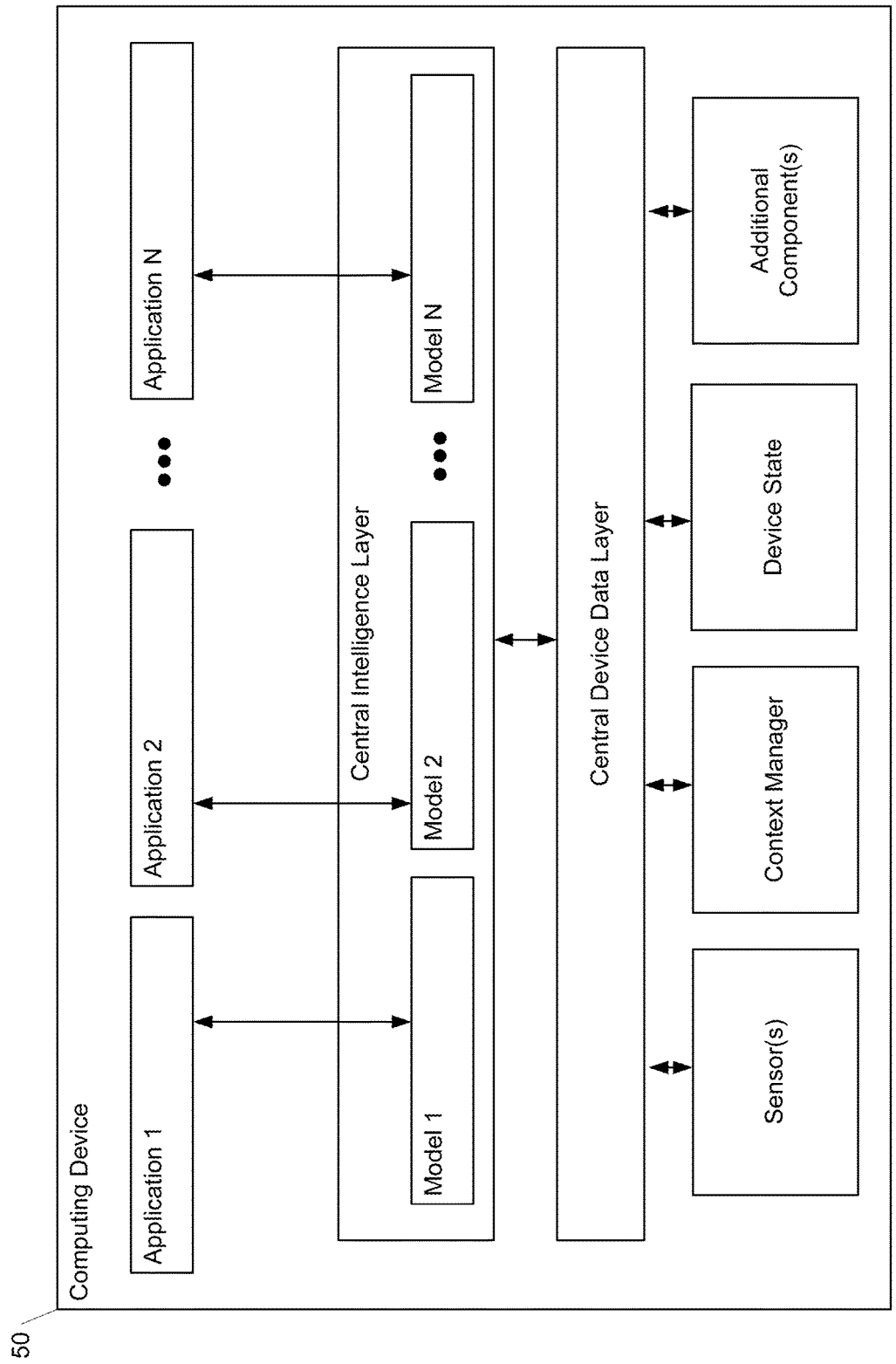

FIG. 5C depicts a block diagram of an example computing device 50 that performs according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 5C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 5C, the central device data layer can communicate with a number of other components of the computing device, such as, for example, one or more sensors, a context manager, a device state component, and/or additional components. In some implementations, the central device data layer can communicate with each device component using an API (e.g., a private API).

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computing system to generate a talking face from an audio signal, the computing system comprising:
   one or more processors; and
   one or more non-transitory computer-readable media that collectively store:
      a machine-learned face geometry prediction model configured to predict a face geometry based on data descriptive of an audio signal that comprises speech;
      a machine learned face texture prediction model configured to predict a face texture based on data descriptive of the audio signal that comprises the speech; and
      instructions that, when executed by the one or more processors, cause the computing system to perform operations, the operations comprising:
         obtaining the data descriptive of the audio signal that comprises speech;
         using the machine-learned face geometry prediction model to predict the face geometry based at least in part on the data descriptive of the audio signal;
         using the machine-learned face texture prediction model to predict the face texture based at least in part on the data descriptive of the audio signal; and
         combining the face geometry with the face texture to generate a three-dimensional face mesh model.

2. The computing system of claim 1, wherein the audio signal comprises a standalone audio signal that is independent of a visual representation of the speech.

3. The computing system of claim 1, wherein the data descriptive of the audio signal comprises a spectrogram of the audio signal.

4. The computing system of claim 1, wherein:
   the face geometry predicted based at least in part on the data descriptive of the audio signal is predicted within a normalized three-dimensional space associated with a three-dimensional mesh; and
   the face texture predicted based at least in part on the data descriptive of the audio signal is predicted within a normalized two-dimensional space associated with a two-dimensional texture atlas.

5. The computing system of claim 1, wherein the operations further comprise inserting the three-dimensional face mesh model into a two-dimensional target video to generate a synthesized video.

6. The computing system of claim 5, wherein inserting the three-dimensional face mesh model into the two-dimensional target video comprises:
   obtaining the two-dimensional target video;
   detecting a target face in the two-dimensional target video;
   aligning the three-dimensional face mesh with the target face at a target position; and
   rendering the three-dimensional face mesh within the two-dimensional target video at the target position to generate the synthesized video.

7. The computing system of claim 5, wherein inserting the three-dimensional face mesh model into the two-dimensional target video comprises:
   generating a fixed atlas from the two-dimensional target video; and
   providing the fixed atlas to the machine-learned face texture prediction model as a proxy lighting map.

8. The computing system of claim 6, wherein detecting the target face comprises
   using a three-dimensional face detector to obtain a pose and a triangle mesh of the target face in the video; and
   decomposing the target face into a three-dimensional normalized space associated with a three-dimensional mesh and a two-dimensional normalized space associated with a two-dimensional texture atlas;
   wherein the face geometry predicted based at least in part on the data descriptive of the audio signal is predicted within the normalized three-dimensional space associated with the three-dimensional mesh; and
   wherein the face texture predicted based at least in part on the data descriptive of the audio signal is predicted within the normalized two-dimensional space associated with the two-dimensional texture atlas.

9. The computing system of claim 1, wherein the operations further comprise rendering the three-dimensional face mesh in a three-dimensional virtual environment.

10. The computing system of claim 1, wherein the audio signal comprises recorded human audio utterances or synthesized text-to-speech audio generated from textual data.

11. The computing system of claim 1, further comprising performing lighting normalization on the face texture predicted by the machine-learned face texture prediction model.

12. The computing system of claim 1, wherein the machine-learned face geometry prediction model and the machine learned face texture prediction model comprise personalized models that are specific to a speaker of the speech included in the audio signal.

13. The computing system of claim 1, wherein the machine-learned face texture prediction model comprises an auto-regressive model that, for each of a plurality of iterations, receives as input a previous iterative prediction of the machine-learned face texture prediction model.

14. The computing system of claim 1, wherein the predicted face texture comprises a combination of a difference map predicted by the machine-learned face texture prediction model and a reference texture atlas.

15. A computer-implemented method to learn to generate a three-dimensional face mesh from a training video, the method comprising:
- obtaining, by a computing system comprising one or more computing devices, the training video comprising visual data and audio data, wherein the visual data depicts a speaker and the audio data comprises speech uttered by the speaker;
- applying, by the computing system, a three-dimensional face landmark detector to the visual data to obtain three-dimensional facial features associated with a face of the speaker;
- projecting, by the computing system and based on the three-dimensional facial features, the training video onto a reference shape to obtain a training face texture;
- predicting, by the computing system and using a machine-learned face geometry prediction model, a face geometry based at least in part on data descriptive of the audio data;
- predicting, by the computing system and using a machine-learned face texture prediction model, a face texture based at least in part on the data descriptive of the audio data;
- modifying, by the computing system, one or more values of one or more parameters of the machine-learned face geometry prediction model based at least in part on a first loss term that compares the face geometry predicted by machine-learned face geometry prediction model with the three-dimensional facial features generated by the three-dimensional face landmark detector; and
- modifying, by the computing system, one or more values of one or more parameters of the machine-learned face texture prediction model based at least in part on a second loss term that compares the face texture predicted by the machine-learned face texture prediction model with the training face texture.

16. The computer-implemented method of claim 15, further comprising:
- generating a fixed atlas from the training video; and
- inputting the fixed atlas into the machine-learned face texture prediction model to serve as a proxy lighting map.

17. The computer-implemented method of claim 16, wherein generating the fixed atlas comprises:
- projecting the training video onto the reference shape using fixed reference facial coordinates; and
- masking pixels that correspond to eye and inner mouth regions.

18. The computer-implemented method of claim 15, wherein the machine-learned face texture prediction model comprises an auto-regressive model that, for each of a plurality of iterations, receives as input a previous iterative prediction of the machine-learned face texture prediction model.

19. The computer-implemented method of claim 15, wherein the predicted face texture comprises a combination of a difference map predicted by the machine-learned face texture prediction model and a reference texture atlas.

20. One or more non-transitory computer-readable media that store instructions that, when executed by a computing system comprising one or more computing devices cause the computing system to perform operations the operations comprising:
- obtaining, by a computing system, a training video comprising visual data and audio data, wherein the visual data depicts a speaker and the audio data comprises speech uttered by the speaker;
- applying, by the computing system, a three-dimensional face landmark detector to the visual data to obtain three-dimensional facial features associated with a face of the speaker;
- projecting, by the computing system and based on the three-dimensional facial features, the training video onto a reference shape to obtain a training face texture;
- predicting, by the computing system and using a machine-learned face texture prediction model, a face texture based at least in part on the data descriptive of the audio data;
- evaluating, by the computing system, a loss term that compares the face texture predicted by the machine-learned face texture prediction model with the training face texture; and
- modifying, by the computing system, one or more values of one or more parameters of the machine-learned face texture prediction model based at least in part on the loss term.

* * * * *